(12) United States Patent
Heo

(10) Patent No.: US 7,471,747 B2
(45) Date of Patent: Dec. 30, 2008

(54) BIT DOWN-SCALING APPARATUS AND METHOD, GPS SYNCHRONIZATION ACQUISITION METHOD, AND GPS RECEIVER

(75) Inventor: Jung-Hun Heo, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 582 days.

(21) Appl. No.: 11/066,844

(22) Filed: Feb. 25, 2005

(65) Prior Publication Data

US 2005/0190820 A1 Sep. 1, 2005

(30) Foreign Application Priority Data

Feb. 28, 2004 (KR) ...................... 10-2004-0013830

(51) Int. Cl.
*H04B 1/707* (2006.01)

(52) U.S. Cl. ...................... 375/343; 375/150; 375/342; 370/320; 370/335; 370/342; 370/441; 370/479; 708/300; 708/422; 708/813; 708/819

(58) Field of Classification Search .................. 375/343
See application file for complete search history.

(56) References Cited

U.S. PATENT DOCUMENTS

| 5,861,841 | A | 1/1999 | Gildea et al. | ................. 342/357 |
| 6,275,186 | B1 | 8/2001 | Kong | .......................... 342/363 |
| 6,754,256 | B1 * | 6/2004 | Kubo et al. | .................. 375/150 |
| 6,775,319 | B2 * | 8/2004 | King et al. | .................... 375/150 |
| 7,184,464 | B2 * | 2/2007 | Abraham et al. | ............ 375/150 |
| 2001/0014116 | A1 * | 8/2001 | Saito et al. | ................... 375/148 |
| 2002/0159542 | A1 * | 10/2002 | Kokkonen et al. | .......... 375/324 |
| 2005/0180531 | A1 * | 8/2005 | Wellig et al. | ................. 375/343 |
| 2005/0190735 | A1 * | 9/2005 | Shinoda | ....................... 370/342 |

FOREIGN PATENT DOCUMENTS

| EP | 1 262 791 A2 | 12/2002 |
| JP | 9-15320 | 1/1997 |
| JP | 2000-131415 | 5/2000 |

* cited by examiner

*Primary Examiner*—Shuwang Liu
*Assistant Examiner*—Helene Tayong
(74) *Attorney, Agent, or Firm*—Mills & Onello, LLP

(57) ABSTRACT

The n-to-m bit down-scaling correlates a plurality of n-bit correlation integral values into a plurality of m-bit data (n>m). The n-bit correlation integral values are obtained by correlating global positioning system (GPS) signals with a plurality of expected codes. Upper (n−m+1) bits are selected from the n-bit correlation integral values, and (n−m+1)-bit estimated absolute values are obtained. A significant bit of a maximum value of the upper (n−m+1) bits of the estimated absolute values is selected. A scale level is obtained based on the significant bit of the maximum value. The n-bit correlation integral values are down-scaled into the m-bit data based on the scale level. The amount of n-bit correlation integral values is reduced into m-bit correlation integral values by the down-scaling method, and thereby reducing a size of the memory for storing the correlation integral values.

14 Claims, 7 Drawing Sheets

BIT DOWN-SCALING APPARATUS AND METHOD, GPS SYNCHRONIZATION ACQUISITION METHOD, AND GPS RECEIVER

CROSS-REFERENCE TO RELATED APPLICATION

This application relies for priority upon Korean Patent Application No. 2004-13830 filed on Feb. 28, 2004, the contents of which are herein incorporated by reference in their entirety.

BACKGROUND OF THE INVENTION

1. Field of the Invention

The present invention generally relates to a spread spectrum global positioning system (GPS) receiver, and more particularly to a method and apparatus capable of reducing the size of a memory that stores n bits correlation integral values during a synchronization acquisition procedure in the GPS receiver.

2. Description of the Related Art

A wide-area GPS is provided with 30 or more satellites in particular orbits. Twelve satellites can belong to one signal coverage and can communicate simultaneously with a GPS receiver at a specific position.

The GPS receiver determines the GPS receiver's position by computing the relative times of arrival of signals transmitted simultaneously from a number of GPS satellites to determine the receiver's distances from the satellites. The GPS satellites transmit, as part of the satellites' message, both satellite positioning data including pseudo-noise (PN) codes and data on clock timing. In order to calculate the position, the GPS receiver has to receive signals of at least four visible satellites within the same signal coverage.

Using the received PN codes, the GPS receiver determines pseudo-ranges to the various GPS satellites, and computes the position of the GPS receiver using the pseudo-ranges and satellite timing and data on clock timing. The satellite data on clock timing and signature data are extracted from the GPS satellite signals once a satellite is acquired and tracked.

Each of the GPS satellites transmits an L1 signal having a carrier frequency of 1575.42 MHz. The frequency of the L1 carrier signal is represented by $154f_0$, where $f_0=10.23$ MHz.

In the satellites, signals are modulated with high rate repetitive signals called pseudo noise sequences (PN codes) according to a code division multiple access (CDMA) scheme and are formed into code modulation wideband signals.

One of the pseudo noise sequences used in the respective satellites to modulate the L1 signal is a coarse-acquisition (C/A) code. The C/A code sequences belong to a family known as Gold codes. Each GPS satellite broadcasts a signal with a unique C/A code. The codes are formed by execution of a modulo-2 addition of two 1023-bit binary sequences. The C/A codes are binary codes and have a binary phase-reversal rate, or "chipping" rate, of 1.023 MHz and a repetition period of 1023 chips for a code period of 1 millisecond.

The carrier of the L1 signal is further modulated with navigation information having a bit rate of 50 bits/s. The navigation information includes various information of the GPS satellite such as health, orbit, clock data parameter related with the GPS satellite and so forth.

The GPS receiver performs a synchronization operation for detecting satellite signals to identify the GPS satellites. Further, the GPS receiver searches signals transmitted from the respective GPS satellites to perform the synchronization operation with the signals transmitted from the GPS satellites so that data transmitted as the signals can be received and demodulated.

The GPS receiver needs to perform the synchronization, for example, in the situation in which the receiver is turned on and the receiver cannot receive any satellite signal during a predetermined time period. Such a situation may frequently occur because a mobile device having the receiver may be moving and thus it is difficult for an antenna of the mobile device to be always located at the most suitable place for receiving the satellite signals, and thus the strength of the signals transmitted to the receiver is weak. In urban areas, buildings influence the satellite signals received from the GPS satellite, and the satellite signals undergo multi-path propagation, in which the satellite signals from the GPS satellites are transmitted to the GPS receiver through various routes such as a direct transmission route from the GPS satellite and different routes that are caused by the satellite signals being reflected by tall buildings. Due to the multi-path propagation, the received signals have time differences and phase differences that can cause errors in determination of position of the receiver.

A distance between the GPS receiver and the GPS satellites is called a pseudo-range due to a clock error between the GPS satellite and the GPS receiver and a signal delay through the atmosphere layers.

The pseudo-ranges correspond to time delay values measured between the received satellite signals from each of the satellites and a local clock signal of the GPS receiver.

Determination of position and time is repeated until sufficient accuracy is achieved.

Pseudo-range calculation is performed by measuring an average of the transmission time of different satellite signals. After the GPS receiver synchronizes with the received signals, information transmitted through the signals is demodulated.

Most GPS receivers use correlation methods to calculate the pseudo-range. Pseudo noise sequences of the GPS satellites are locally stored or produced in the GPS receiver.

Down-conversion for the received satellite signal is performed, and the GPS receiver correlates the down-converted signal with the locally stored or produced pseudo noise (PN) sequences. The correlated result is integrated. The correlation integral value (or sampling value) indicates the presence of the satellite signal in the received satellite signal. The correlation operation executed in the GPS receiver is repeated so that a phase of the pseudo noise sequence stored in the receiver is shifted. The phases of the PN sequence are tracked until an accurate phase is obtained. The accurate phase is obtained when a correlation result is the highest.

The synchronization and phase (or frequency) adjusting processing is repeated for respective satellite signals received in the receiver. Therefore, such processing time is very long in a situation in which the strength of the received signals is weak.

In conventional GPS receivers, several correlators are used to accelerate the processing speed, so that more correlation peaks can be searched at the same time. However, the number of correlators cannot increase infinitely, and thus there is a limitation to accelerating the synchronization and the phase (or frequency) adjusting process by simply increasing the number of the correlators.

Generally, the receiver has a plurality of channels for the sake of rapid synchronization, and the respective channels include multiple correlators. The number of correlation integral values stored in a memory of the GPS receiver increases in proportion to the number of channels and correlators, and thus a large amount of storage space is needed. In addition, in order to perform an algorithm for determining synchronization acquisition in a processor based on the data stored in the memory, data access amount between the processor and the memory is increased according to the number of correlation integral values stored in the memory increases.

Thus, in order to store a large amount of data in the memory at a high speed and in order to read out the data from the memory at a high speed, an increased memory access time is required. The memory access time is an important factor affecting acquisition speed and thus performance of the GPS receiver.

There is a need for a large capacity memory for storing a lot of data for the acquisition in the GPS receiver, and thus a size of the memory increases, and thus it is difficult to reduce the size of the GPS receiver.

SUMMARY OF THE INVENTION

Accordingly, the present invention provides a bit downscaling method and a bit down-scaling apparatus that can reduce a size of a memory for storing correlation integral values.

The present invention further provides a synchronization acquisition method and a GPS receiver that reduces the number of bits of the correlation integral values and thus reduces the size of the memory.

In accordance with a first aspect, the invention is directed to a method of down-scaling a plurality of n-bit correlation integral values into a plurality of m-bit data (n>m), the n-bit correlation integral values being obtained by correlating global positioning system (GPS) signals with a plurality of expected codes, includes: selecting upper (n−m+1) bits from the n-bit correlation integral values to obtain (n−m+1)-bit estimated absolute values; detecting a significant bit of a maximum value of the upper (n−m+1) bits of the estimated absolute values; obtaining a scale level based on the significant bit of the maximum value; and down-scaling the n-bit correlation integral values into the m-bit data based on the scale level.

The scale level can be obtained based on a position of the significant bit of the maximum value. The maximum value can be obtained by a bitwise inclusive OR operation for the (n−m+1)-bit estimated absolute values. The scale level can have (n−m+1) levels depending upon the position of the significant bit, and the position of the significant bit can correspond to a position of a bit value "1" first shown from a most significant bit of the maximum value. The down-scaled m-bit data can contain a sign bit of the n-bit correlation integral values. In one embodiment, n is 16, and m is 8.

In accordance with another aspect, the invention is directed to an apparatus for down-scaling a plurality of n-bit correlation integral values into a plurality of m-bit data (n>m), the n-bit correlation integral values being obtained by correlating global positioning system (GPS) signals with a plurality of expected codes. In accordance with the apparatus of the invention, an absolute value producing unit is configured to select upper (n−m+1) bits from the n-bit correlation integral values to obtain (n−m+1)-bit estimated absolute values. A maximum value detector is configured to detect a significant bit of a maximum value of the upper (n−m+1) bits of the estimated absolute values. A scale determiner is configured to determine a scale level based on the significant bit of the maximum value. A down-scaling processor is configured to down-scale the n-bit correlation integral values into the m-bit data based on the scale level.

The absolute value producing unit can include a logical operator which performs a bitwise negation for (n−m+1) bits of the n-bit correlation integral values when a sign bit of the n-bit correlation integral values is negative to obtain a one's complement of the (n−m+1) bits of the n-bit correlation integral values. The scale determiner may determine the scale level based on a position of the significant bit of the maximum value. The apparatus can further include a memory configured to store the down-scaled m-bit data and the corresponding scale level.

In accordance with another aspect, the invention is directed to a method of performing a synchronization acquisition for global positioning system (GPS) signals. The method includes: receiving the GPS signals through a plurality of channels; correlating the GPS signals with a plurality of expected codes having respectively different delay characteristics to generate a plurality of correlation values; integrating the correlation values during a predetermined time period to produce a plurality of n-bit correlation integral values, n being a positive natural number; down-scaling the n-bit correlation integral values into m-bit data based on a scale level; storing the m-bit data in a memory; reading out the stored m-bit data from the memory to restore n-bit data based on the scale level; and performing a fast Fourier transform (FFT) for the restored n-bit data to obtain a maximum correlation integral value based on a result of the FFT.

In accordance with another aspect, the invention is directed to an apparatus for performing a synchronization acquisition operation on global positioning system (GPS) signals. In the apparatus, a plurality of correlators are configured to correlate the GPS signals with a plurality of expected codes respectively having different delay characteristics to generate a plurality of correlation values. A plurality of integrators are configured to integrate the correlation values during a predetermined time period to generate a plurality of correlation integral values. A down-scaling circuit is configured to down-scale the n-bit correlation integral values into m-bit data based on a scale level. A memory is configured to store the m-bit data. A processor is configured to read out the stored m-bit data from the memory to restore n-bit data based on the scale level, and configured to perform a fast Fourier transform (FFT) for the restored n-bit data to obtain a maximum correlation value based on a result of the FFT.

In accordance with another aspect, the invention is directed to a global positioning system (GPS) receiver. The GPS receiver of the invention includes: a radio frequency receiver configured to receive global positioning system (GPS) signals via a plurality of channels. A correlator is configured to correlate the GPS signals with each of a plurality of expected codes having respectively different delay characteristics to generate n-bit correlation integral values. A down-scaling circuit is configured to down-scale the n-bit correlation integral values into m-bit data based on a scale level. A fast Fourier transformer is configured to perform a FFT for the n-bit correlation integral values to calculate a FFT result value. A memory is configured to store the down-scaled m-bit data and the FFT result value, and a memory controller is configured to control data transmission among the memory, the down-scaling circuit and the fast Fourier transformer. A processor is configured to calculate a maximum correlation value based on the FFT result value stored in the memory to control a synchronization acquisition of the correlator.

BRIEF DESCRIPTION OF THE DRAWINGS

The foregoing and other objects, features and advantages of the invention will be apparent from the more particular description of preferred aspects of the invention, as illustrated in the accompanying drawings in which like reference characters refer to the same parts throughout the different views. The drawings are not necessarily to scale, emphasis instead being placed upon illustrating the principles of the invention.

DESCRIPTION OF THE EXEMPLARY EMBODIMENTS

Hereinafter, the exemplary embodiments of the present invention will be described in detail with reference to the accompanying drawings.

Figure 1:
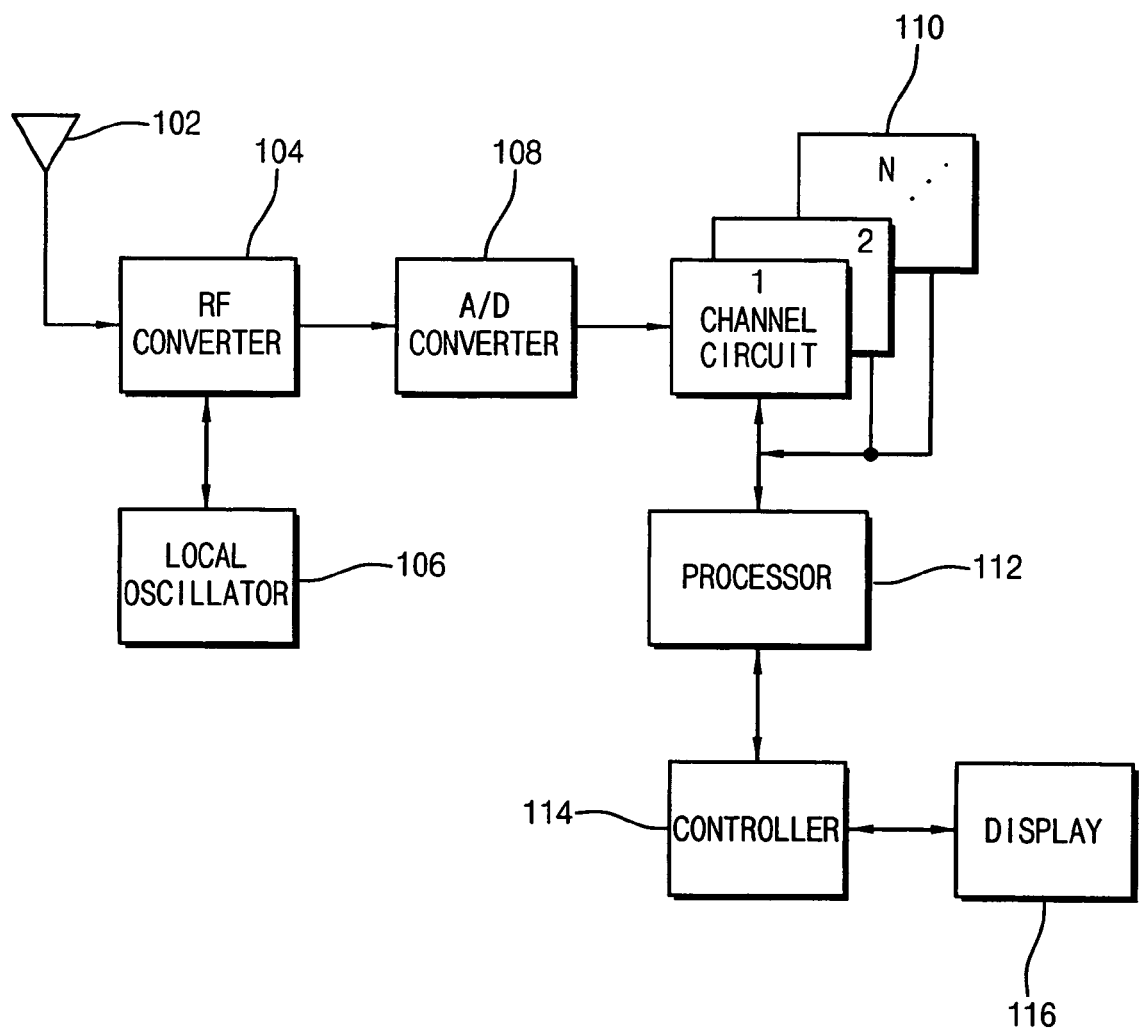
FIG. 1 is a block diagram of a conventional GPS receiver.

FIG. 1 is a block diagram of a conventional GPS receiver. The GPS receiver 100 receives radio frequency (RF) GPS signals of 1575.42 MHz transmitted from GPS satellites through a GPS antenna 102. The received RF GPS signals are provided to a RF converter 104. The received RF GPS signals are mixed with a local oscillator signal provided from a local oscillator 106 and are down-converted to an intermediate frequency (IF) GPS signal. For example, the radio frequency converter 104 includes a low noise amplifier (LNA), a filter, a mixer, an IF amplifier, and a quadrature mixer. An in-phase (I) IF signal and a quadrature-phase (Q) IF signal are generated by the radio frequency converter 104.

The I and Q IF signals are converted to digital IF data signals by an analog-to-digital (A/D) converter 108, and then transferred to a plurality of channel circuits 110. The respective channel circuits 110 perform correlation operations to search a maximum correlation value (or correlated peak signal) for the purpose of synchronization acquisition and for the purpose of tracking the GPS signals provided from selected satellites. A processor 112 performs the synchronization acquisition and the tracking operation based on the searched maximum correlation value to calculate a pseudo-range that represents a distance between the GPS receiver and the respective satellites. The controller 114 calculates a position value of the GPS receiver based on a plurality of pseudo-ranges provided from the processor 112, and displays the calculated position value on a display device 116.

Figure 2:
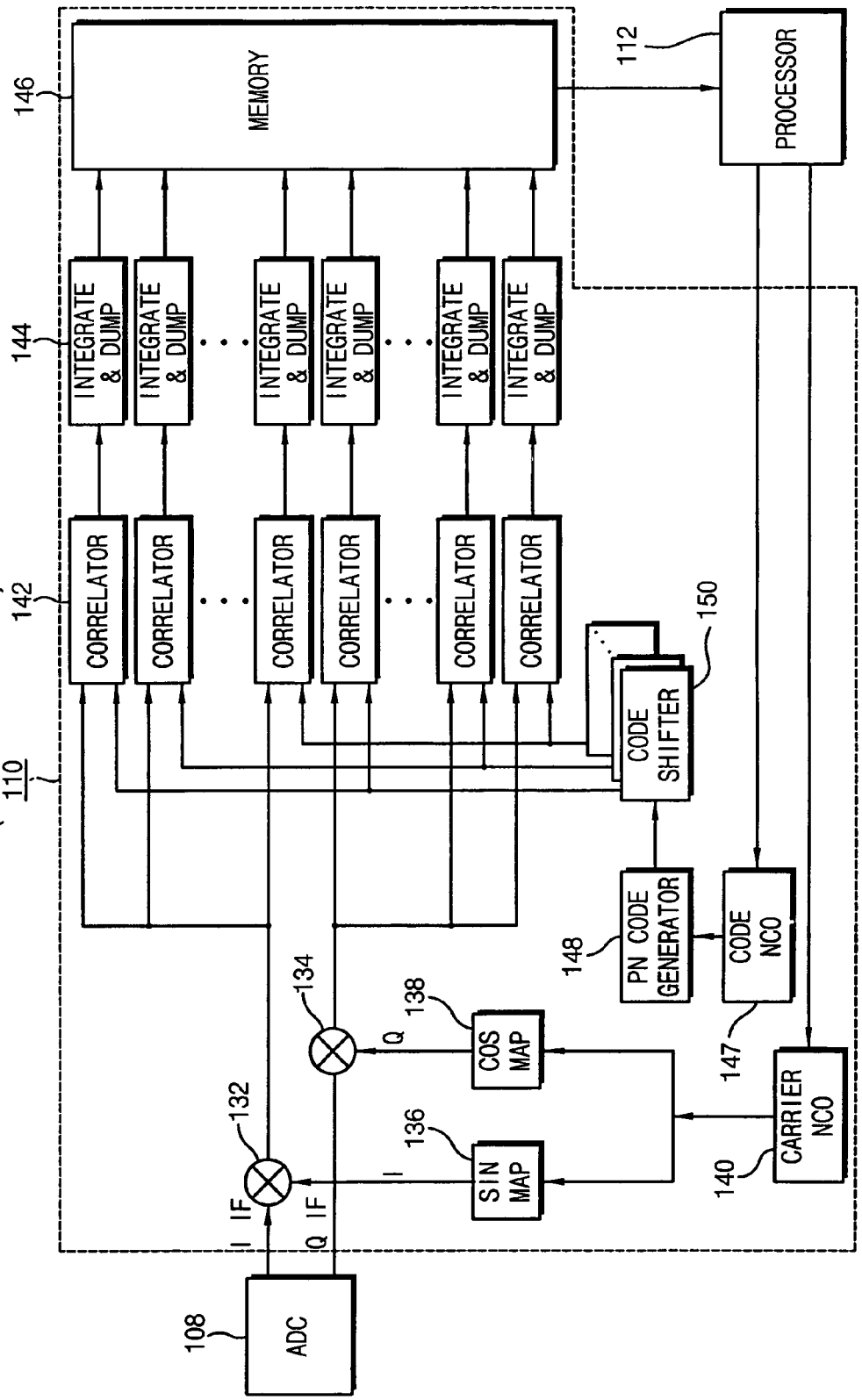
FIG. 2 is a block diagram illustrating a channel circuit of the GPS receiver of FIG. 1.

Referring to FIG. 2, the conventional channel circuit 110 performs a two-dimensional searching process for acquiring a coarse-acquisition (C/A) code and a carrier frequency of the satellite signals for the respective channel circuits 110.

I and Q IF signals from the ADC 108 contain a Doppler frequency. A Doppler frequency is generated through a carrier numerical controlled oscillator (NCO) 140 and then I and Q signals respectively are generated through an in-phase generator 136 and a quadrature-phase generator 138. The I and Q signals are respectively multiplied by the I and Q IF signals in an I (in-phase) multiplier 132 and a Q (quadrature-phase) multiplier 134.

The multiplied signals are correlated with expected codes by a multiple-correlator 142. The I and Q signals and expected codes having different delay characteristics are supplied to a plurality of correlators 142, respectively. The expected codes having different delay characteristics are generated by a code shifter 150. The code shifter 150 receives one pseudo-noise (PN) code from a PN code generator 148 and delays the PN code sequentially to generate expected codes, and transmits the expected codes to the respective correlators 142. The PN code generator 148 generates an expected code replicated from a code corresponding to a phase determined by the processor 112 in synchronization with a clock signal provided from a code NCO 147.

The respective correlators 142 perform correlation operations between the received I and Q IF signals and the expected codes to generate correlation values, and the correlation values are integrated by respective integrators 144 during a pre-detection integration time period, i.e., sample time period. The correlation integral values obtained in the integrator 144 are stored in a memory 146 per a sample time period.

Therefore, when the number of the correlators per channel is "n", n correlation integral values (or sample values) are stored in the memory per the sample time period.

When the correlation integral values are stored as FFT points, for example, 16 FFT points, in the memory 146, the processor 112 brings 16 correlation integral values of the respective correlator 220 from the memory 146 to perform a 16-point FFT operation on the correlation integral values when 16 sample time periods are lapsed. At this time, in case where any of FFT result values exceeds a threshold value, the processor 112 concludes that the received GPS matches to the expected code. Therefore, a tracking process is performed.

However, when the FFT result value is less than the threshold value, the processor 112 concludes that the received GPS signal does not match to the expected code and that the received GPS signal corresponds to noise. Therefore, the processor 112 varies a search range, i.e., varies a phase and a frequency, and the processor 112 controls the carrier NCO 140 and the code NCO 147 to vary the expected code based on the varied phase and frequency.

As described above, in the conventional GPS receiver, the number of the correlation integral values (i.e., sample data) stored in the memory is determined by the product of the number of the channel, the number of the correlators per channel and the number of FFT points, and thus a large capacity of memory is required.

Since a write operation, in which a large amount of sample data are written into the memory 146, and read operation, in which the sample data are read from the memory 146, should be performed at a high speed, it is required a hardware interface between the processor 112 and the memory 146 that can support the high speed write and read operations.

In addition, when the number of correlators increases for the purpose of reducing the time used for the synchronization acquisition and the tracking operations, it is more difficult to design the hardware interface between the memory 146 and the processor 112.

In order to solve the above-described problems, the present invention provides a correlation method in which the correlation integral values are down-scaled to be stored in the memory, to thereby reduce a size of the memory.

Figure 3:
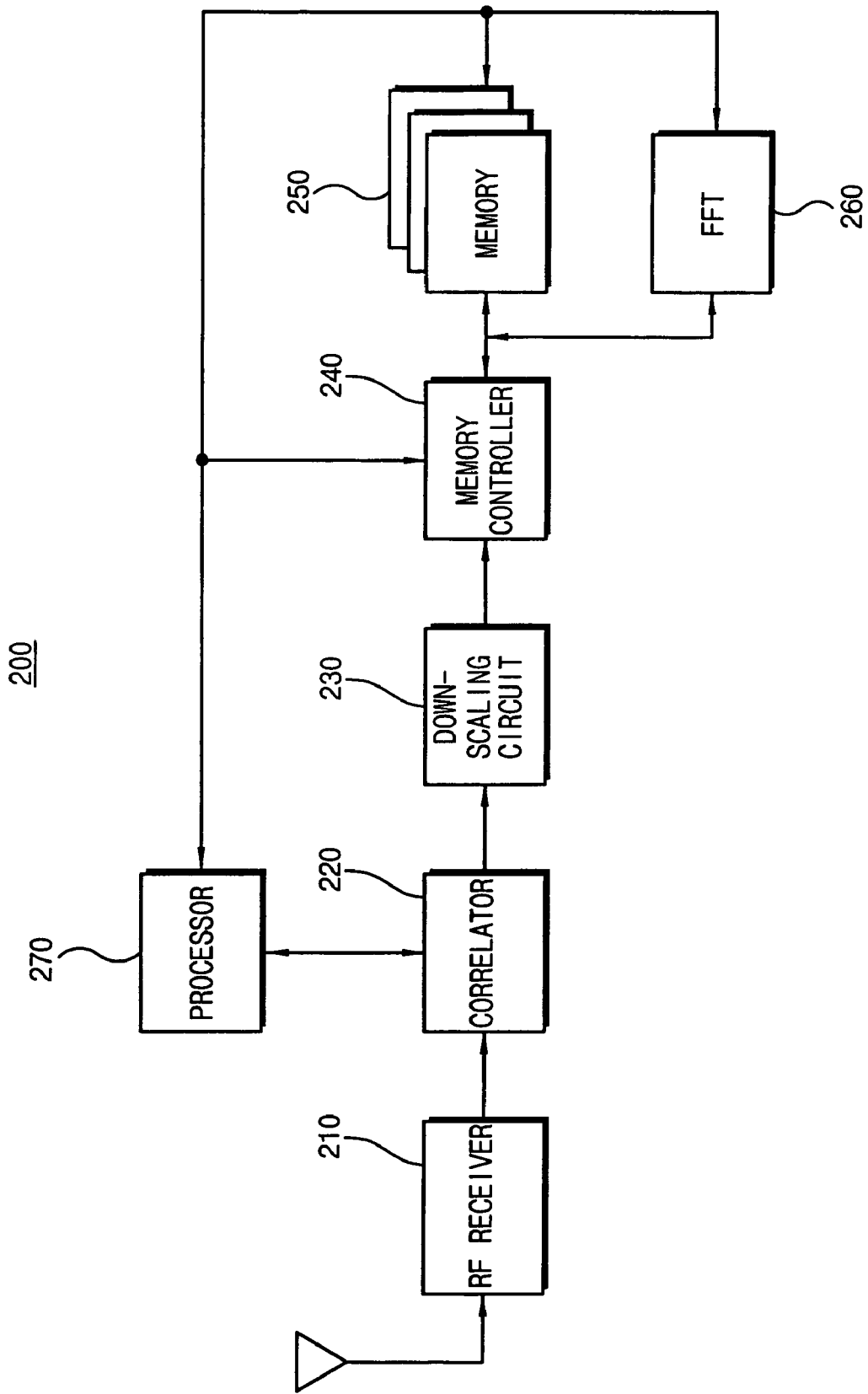
FIG. 3 is a block diagram of a GPS receiver according to an exemplary embodiment of the present invention.
Figure 4:
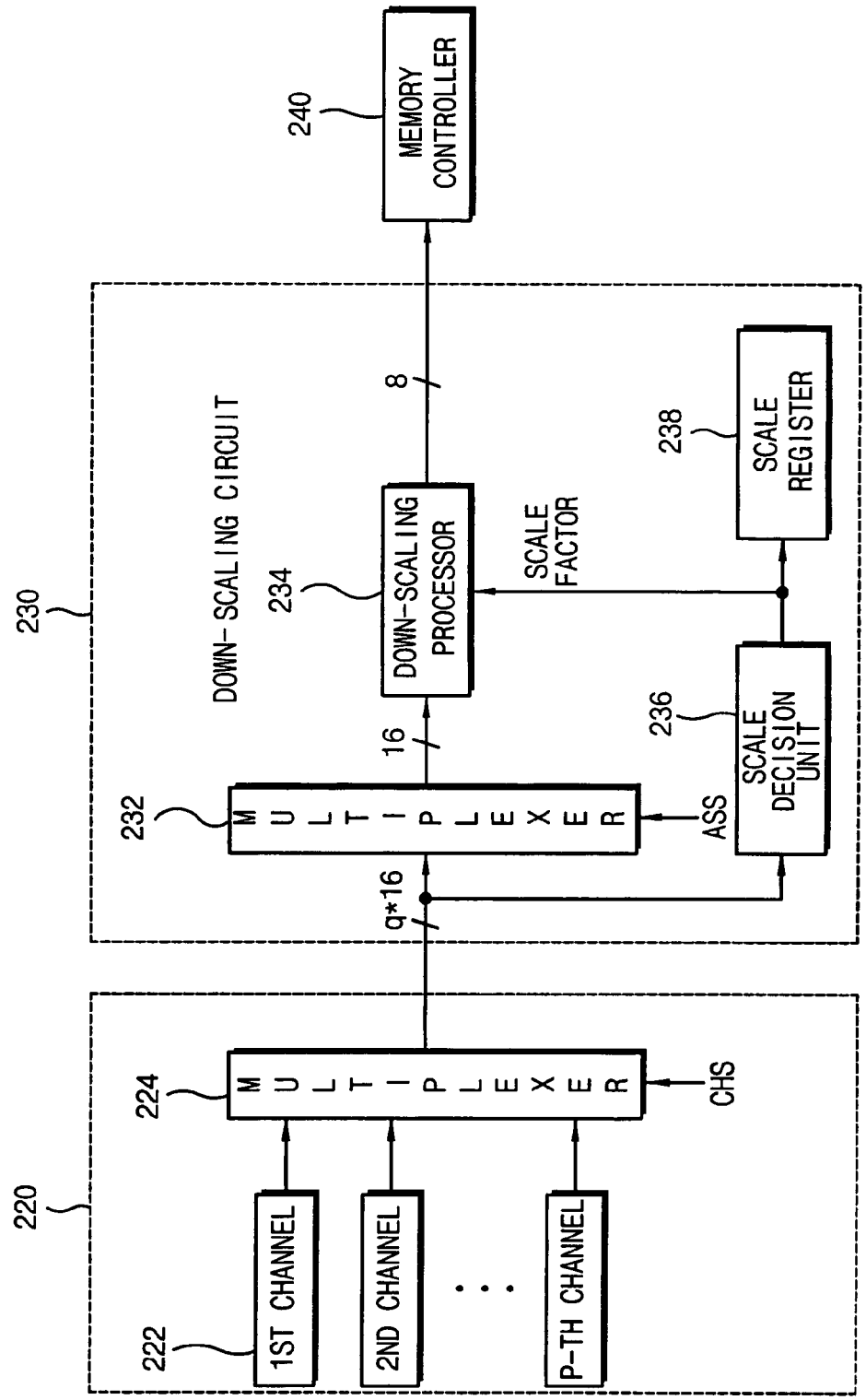
FIG. 4 is a block diagram illustrating a down-scaling circuit of the GPS receiver of FIG. 3.
Figure 5:
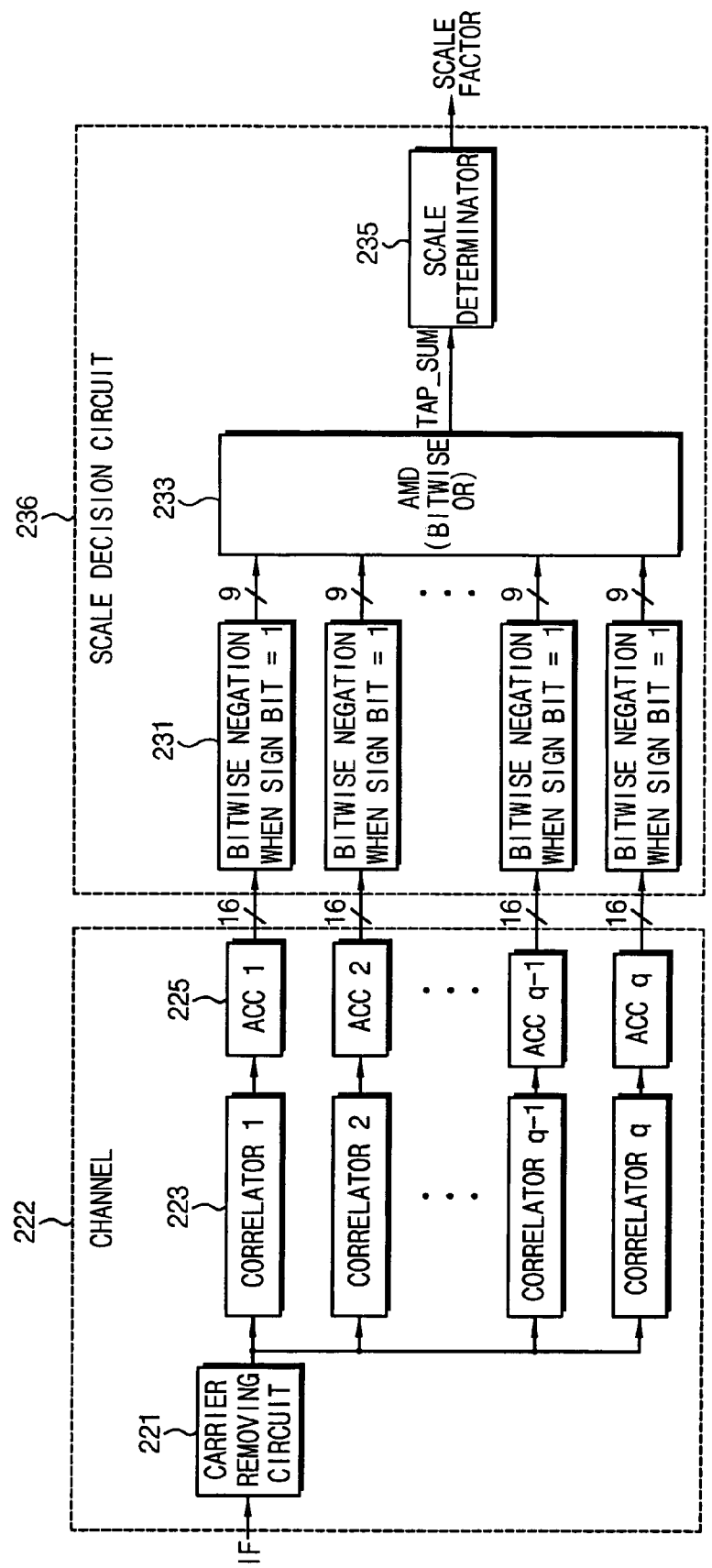
FIG. 5 is a block diagram illustrating a scale decision unit of the GPS receiver of FIG. 4.

FIGS. 3 through 5 show a GPS receiver 200 according to an exemplary embodiment of the present invention.

Referring to FIG. 3, the GPS receiver 200 includes a radio frequency receiver 210, a correlator 220, a down-scaling circuit 230, a memory controller 240, a memory 250, a fast Fourier transformer 260, and a processor 270.

The radio frequency receiver 210 converts RF global positioning system (GPS) signals into IF GPS signals, and the IF GPS signals are converted into digital IF GPS signals.

The correlator 220 includes a plurality of p channels (p is a natural number) in order to search a plurality of satellites. The correlator 220 correlates the digital IF GPS signals outputted from the radio frequency receiver 210 with expected codes to generate correlation values. The expected codes are locally generated and may be varied under the control of the processor 270. The correlator 220 accumulates (or integrates) the correlation values during a predetermined time period to generate n-bit correlation integral values (or n-bit sample data).

The down-scaling circuit 230 sequentially down-scales the n-bit correlation integral values into m-bit data (m<n, m is a natural number). The FFT (Fast Fourier transform) 260 performs an FFT operation on the n-bit correlation integral values.

The memory controller 240 operatively stores the m-bit data into the memory 250, operatively provides the m-bit data stored in the memory 250 to the fast Fourier transform 260, operatively receives FFT result value from the fast Fourier transform 260 to store the FFT result in the memory 250, and provides the FFT result value stored in the memory 250 to the processor 270.

The processor 270 controls operation of the system. The processor 270 compares the FFT result value with a threshold value to obtain a maximum correlation value for all p channels. The processor 270 varies the correlation values of the correlator of the channel having the maximum correlation value so that the correlation value increases, and performs synchronization acquisition for the received GPS signal. The processor 270 also produces a current position value of the GPS receiver through a tracking operation and position calculation during the synchronization acquisition operation, and displays the result through a user interface (not shown).

Referring to FIG. 4, the down-scaling circuit 230 includes a multiplexer 232, a down-scaling processor 234, a scale decision unit 236, and a scale register 238. The correlator 220 includes a plurality of channels 222 and a multiplexer 224. Referring to FIG. 5, each channel 222 includes a plurality of correlators 223 (correlator 1, correlator 2, ..., correlator q) and a plurality of accumulators 225 (ACC1, ACC2, ..., ACC q).

Referring again to FIG. 4, the correlator 220 couples one of the channels 222, which is selected by the multiplexer 224 among the p channels, to the down-scaling circuit 230 in response to a channel selecting signal CHS. One of the channels 222 may be sequentially selected in response to the channel selecting signal CHS.

Referring again to FIG. 5, each of the p (which is a natural number) channels includes a carrier removing circuit 221, a plurality of correlators 223 (correlator 1, correlator q) and a plurality of accumulators (ACC1, ..., ACCq).

The carrier removing circuit 221 removes the carrier and Doppler frequency component from the IF GPS signals. The correlators 223 correlate corresponding GPS signals with the expected codes, respectively, to generate n-bit correlation values. The accumulators 225 accumulate the n-bit correlation values to generate n-bit correlation integral values.

The multiplexer 232 selects one of q (which is a natural number) n-bit correlation integral values provided from q integrators (or accumulators) 225 in one channel 222 in response to an accumulator selecting signal ASS. The multiplexer 232 may sequentially select one of the q n-bit correlation integral values in response to the accumulator selecting signal ASS.

The selected n-bit correlation integral value is provided to the down-scaling processor 234 to be down-scaled to m-bit data based on a scale factor.

The scale decision unit 236 determines a scale factor or a scale level from q n-bit correlation integral values provided from q accumulators 225. The determined scale factor or scale level is stored in the scale register 238 and is provided to the down-scaling processor 234. The n-bit correlation integral values may be restored based on the stored scale factor.

One scale factor is obtained for q m-bit data.

The down-scaled m-bit data are stored in the memory 250 through the memory controller 240.

Referring to FIG. 5, the scale decision unit 236 includes q absolute value producing units 231, a maximum value detector 233, and a scale determinator 235. The absolute value producing units 231 obtains (n−m+1)-bits of estimated absolute value by selecting upper (n−m+1)-bits among q n-bit correlation integral values provided from the q accumulators 225 contained in the respective channel 222. When the n-bit correlation integral values have a sign bit of "1," the absolute value producing unit 231 performs a bitwise negation operation on the upper (n−m+1) bits. By contrast, when the n-bit correlation integral values have the sign bit "0," the absolute value producing unit 231 bypasses the upper (n−m+1) bits to produce an estimated absolute value. Here, a symbol "~" denotes a bitwise negation operator. When a binary "a"=1111 0011 1001 0001, a bitwise negation operation of the "a" is "~a"=0000 1100 0110 1110. That is, "~a" represents a one's complement of the "a".

The maximum value detector 233 performs a bitwise inclusive OR operation on the upper (n−m+1) bits to detect a position of a significant bit, which is a position of the bit value "1" first shown from the most significant bit of the maximum value among q estimated absolute values. The bitwise inclusive OR is represented by an operator "|."

For example, when a binary value "a"=0001 0011 1001 0001 and a binary value "b"=0000 0001 1111 1000, a bitwise inclusive OR operation of the "a" and "b" a|b=0001 0011 1111 1001.

Therefore, the result TAP_SUM of the bitwise inclusive OR operation corresponds to the significant bit of the maximum value among the estimated absolute values.

The scale determinator 235 determines a scale level based on the position of the significant bit of the maximum estimate absolute value to generate a scale factor corresponding to the scale level such as shown in Table 1. The scale factor is stored in the scale register 238 and forwarded to the down-scaling processing unit 234.

The down-scaling processor 234 down-scales the n-bit correlation integral values provided from the multiplexer 232 into m-bit data in response to a corresponding scale factor as shown in Table 1. The n-to-m down-scaling (for the exemplary embodiment in which n=16 and m=8) is summarized as shown in Table 1. In restoration value, "s" denotes a sign bit.

TABLE 1

| 9-bit detected maximum value | Scale level | 8 bits selected from 16-bit correlation integral value | Restored value |
|---|---|---|---|
| 01xx xxxx x | 8 | [15:8] | sxxx xxxx 0000 0000 |
| 001x xxxx x | 7 | [14:7] | ssxx xxxx x000 0000 |
| 0001 xxxx x | 6 | [13:6] | sssx xxxx xx00 0000 |

TABLE 1-continued

| 9-bit detected maximum value | Scale level | 8 bits selected from 16-bit correlation integral value | Restored value |
|---|---|---|---|
| 0000 1xxx x | 5 | [12:5] | ssss xxxx xxx0 0000 |
| 0000 01xx x | 4 | [11:4] | ssss sxxx xxxx 0000 |
| 0000 001x x | 3 | [10:3] | ssss ssxx xxxx x000 |
| 0000 0001 x | 2 | [9:2] | ssss sssx xxxx xx00 |
| 0000 0000 1 | 1 | [8:1] | ssss ssss xxxx xxx0 |
| 0000 0000 0 | 0 | [7:0] | ssss ssss sxxx xxxx |

For example, the bit down-scaling processing is performed as shown in Tables 2 and 3. Hereinafter, for this exemplary illustration, it is assumed that n=16, and m=8.

Referring to Table 2, the scale level is "8", and thus upper 8-bit value [15:8] from the most significant bit MSB (a sign bit) of the n-bit correlation integral value is obtained as a bit down-scaled m-bit data.

Referring to Table 3, the scale level is "6", and thus upper 8-bit value [13:6] from (MSB-2)th bit is obtained as a bit down-scaled m-bit data.

TABLE 2

| ACC | n bit correlation integral value | Decimal value | (n − m + 1) bits of Estimated absolute value | Bitwise - OR | Scale level | Bit down-scaled m-bit data ([15:8]) |
|---|---|---|---|---|---|---|
| ACC 1 | 0010 0100 1100 0000 | +9,408 | 0010 0100 1 | 0111 1111 1 | 8 | 0010 0100 |
| ACC 2 | 0001 0010 0000 0000 | +4,608 | 0001 0010 0 | | | 0001 0010 |
| ACC 3 | 0001 1001 0001 1111 | +6,431 | 0001 1001 0 | | | 0001 1001 |
| ACC 4 | 1000 0011 0001 1010 | −31,974 | 0111 1100 1 | | | 1000 0011 |

TABLE 3

| ACC | n bit correlation integral value | Decimal value | (n − m + 1) bits of estimated absolute value | Bitwise - OR | Scale level | Bit down-scaled m-bit data ([15:8]) |
|---|---|---|---|---|---|---|
| ACC 1 | 0001 0100 1100 0000 | +5,312 | 0001 0100 1 | 0001 1111 1 | 6 | 0 1 0100 11 |
| ACC 2 | 0000 1010 0000 0000 | +2,560 | 0000 1010 0 | | | 0 0 1010 00 |
| ACC 3 | 0001 1001 0001 1111 | +6,431 | 0001 1001 0 | | | 0 1 1001 00 |
| ACC 4 | 1111 1101 0001 1010 | −742 | 0000 0010 1 | | | 1 1 1101 00 |

TABLE 4

| Tap no. | FFT point No. | FFT result values of conventional art | FFT result values of the present invention | Error | Error rate (%) |
|---|---|---|---|---|---|
| 15 | 0 | 24880 | 25071 | 191 | 0.77 |
| | 1 | 7182 | 7210 | 28 | 0.39 |
| | 2 | 7422 | 7384 | −38 | −0.51 |
| | 3 | 5261 | 5264 | 3 | 0.06 |
| | 4 | 4617 | 4696 | 79 | 1.71 |
| | 5 | 3764 | 3723 | −41 | −1.09 |
| | 6 | 4753 | 4759 | 6 | 0.13 |
| | 7 | 1742 | 1702 | −40 | −2.30 |
| | 8 | 4252 | 4247 | −5 | −0.12 |
| | 9 | 5450 | 5447 | −3 | 0.06 |
| | 10 | 5532 | 5510 | −22 | 0.40 |
| | 11 | 3451 | 3423 | −28 | 0.81 |
| | 12 | 5231 | 5205 | −26 | 0.50 |
| | 13 | 5321 | 5337 | 16 | 0.30 |
| | 14 | 8044 | 8002 | −42 | 0.52 |
| | 15 | 21982 | 21975 | −7 | 0.03 |

Figure 6:
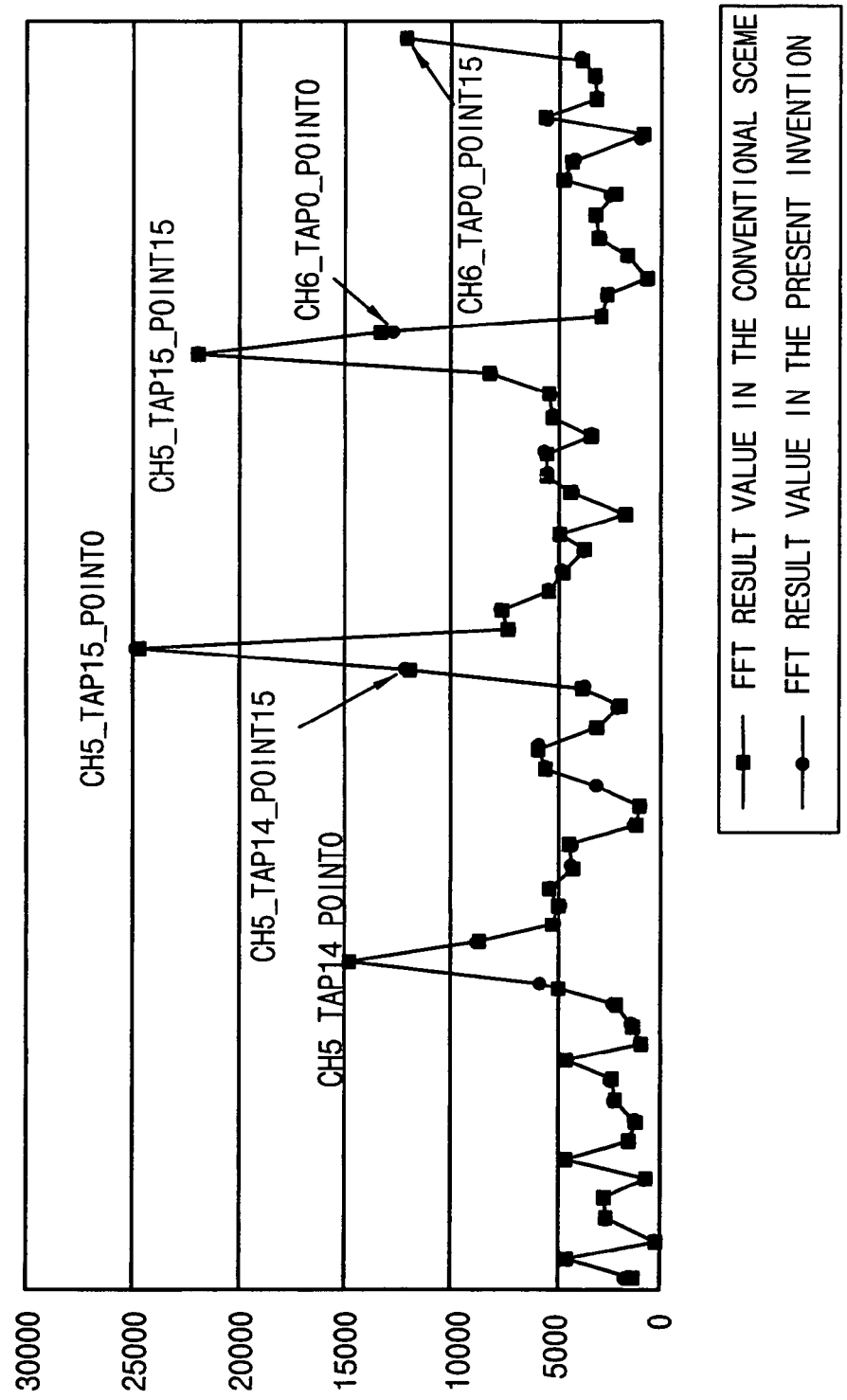
FIG. 6 is a graph illustrating a FFT result of a conventional method and a FFT result of a down-scaling method according to the present invention when one-half chip resolution is applied.

Referring to FIG. 6 according to simulation 1, a peak occurs at a FFT point "0" of channel 5 and tap 15 in both the conventional method and the down-scaling method of the present invention. That is, a position of the peak can accurately be detected even though the down-scaling method is applied to the GPS receiver. In addition, since the errors of the FFT result values are within about 2% when the down-scaling method is used, the synchronization acquisition operation is not affected by the down-scaling method.

<Simulation 2>

A simulation 2 is performed in conditions of 12 channels, 16 taps per channel, 16-bit accumulator, 8-bit down-scaling, <Simulation 1>

A simulation 1 is performed in conditions of 12 channels (p=12), 16 taps per channel (q=16), 16-bit accumulator, 8-bit down-scaling (m=8), buffer time 3.747 ms, sample time 2.34 ms (buffer time/number of FFT-points), 27th SV (space vehicle No.), +3 kHz Doppler frequency, ½ chip resolution, and 16 point FFT,. According to the simulation 1, a peak occurs at Tap 15. Errors of the FFT result values for a correlation integral value of Tap 15 are shown in Table 4.

buffer time 3.747 ms, sample time 2.34 ms (buffer time/number of FFT-points), 27th SV (space vehicle No.), +3 kHz Doppler frequency, ¼ chip resolution, and 16 FFT points. According to the simulation 2, a peak occurs at Tap 14. Errors of the FFT result values for a correlation integral value of Tap 14 are shown in Table 5.

TABLE 5

| Tap no. | FFT point No. | FFT result values of conventional art | FFT result values of the present invention | Error | Error rate (%) |
|---|---|---|---|---|---|
| 14 | 0 | 24880 | 25084 | 204 | 0.82 |
|  | 1 | 7182 | 7229 | 47 | 0.65 |
|  | 2 | 7422 | 7406 | −16 | −0.22 |
|  | 3 | 5261 | 5286 | 25 | 0.48 |
|  | 4 | 4617 | 4716 | 99 | 2.14 |
|  | 5 | 3764 | 3725 | −39 | −1.04 |
|  | 6 | 4753 | 4737 | −16 | 0.34 |
|  | 7 | 1742 | 1680 | −62 | −3.56 |
|  | 8 | 4252 | 4226 | −26 | −0.61 |
|  | 9 | 5450 | 5435 | −15 | 0.28 |
|  | 10 | 5532 | 5503 | −29 | 0.52 |
|  | 11 | 3451 | 3487 | 36 | 1.04 |
|  | 12 | 5231 | 5218 | −13 | −0.25 |
|  | 13 | 5321 | 5360 | 39 | 0.73 |
|  | 14 | 8044 | 8024 | −20 | −0.25 |
|  | 15 | 21982 | 21972 | −10 | −0.05 |

Figure 7:
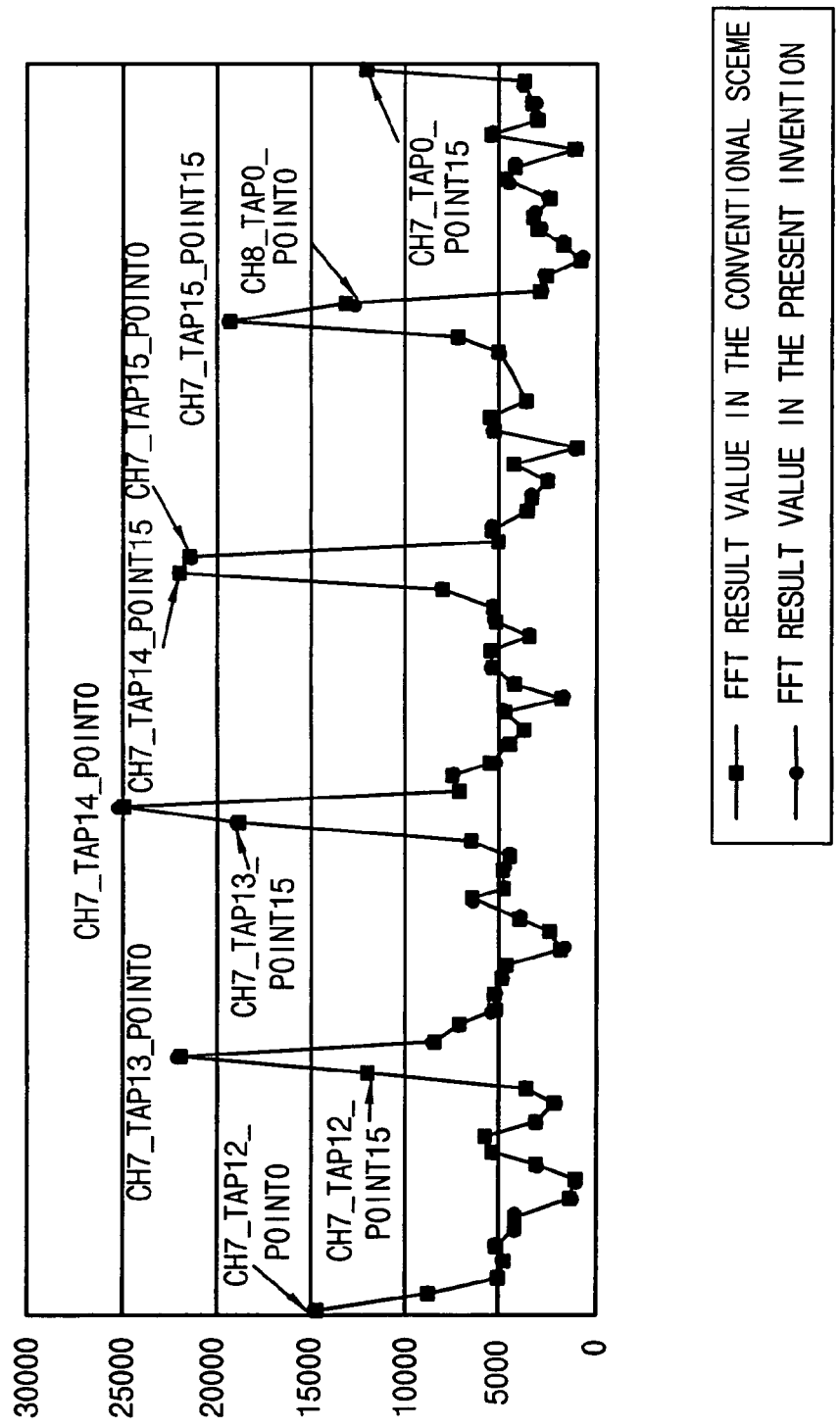
FIG. 7 is a graph illustrating a FFT result of a conventional method and a FFT result of a down-scaling method according to the present invention when one-quarter chip resolution is applied.

Referring to FIG. 7 according to the simulation 2, a peak occurs at a FFT point "0" of channel 7 and tap 14 in both the conventional method and the down-scaling method of the present invention. That is, a position of the peak can accurately be detected even though the down-scaling method is used. Also, since errors of the FFT result values are within about 2% when the down-scaling method is applied to ¼ chip resolution, the synchronization acquisition operation is not affected by the down-scaling method.

Therefore, even though 16-bit correlation integral value is down-scaled to an 8-bit data by the down-scaling method of the present invention, accurate synchronization acquisition may be performed, thereby significantly reducing a memory size.

As described above, according to the present invention, all n bits of the correlation integral values provided from a plurality of accumulators are not stored in the memory, however, the n bits of correlation integral values are down-scaled to m (m<n) bits of estimated data based on the scale factor stored in the memory while maintaining the scale ratio of the absolute values of the correlation integral values of the plurality of accumulators, thereby significantly reducing memory storage capacity without affecting the synchronization acquisition operation. As a result, the hardware cost of the GPS receiver may be reduced, and a light and small-sized GPS receiver can be achieved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of down-scaling a plurality of n-bit correlation integral values into a plurality of m-bit data (n>m), the n-bit correlation integral values being obtained by correlating global positioning system (GPS) signals with a plurality of expected codes, the method comprising:

selecting upper (n−m+1) bits from the n-bit correlation integral values to obtain (n−m+1)-bit estimated absolute values, wherein n and m are positive natural numbers;

detecting a significant bit of a maximum value of the upper (n−m+1) bits of the estimated absolute values;

obtaining a scale level based on the significant bit of the maximum value; and down-scaling the n-bit correlation integral values into the m-bit data based on the scale level.

2. The method of claim 1, wherein the scale level is obtained based on a position of the significant bit of the maximum value.

3. The method of claim 1, wherein the maximum value is obtained by a bitwise inclusive OR operation for the (n−m+1)-bit estimated absolute values.

4. The method of claim 3, wherein the scale level has (n−m+1) levels depending upon the position of the significant bit, the position of the significant bit corresponding to a position of a bit value "1" first shown from a most significant bit of the maximum value, wherein n and m are positive natural numbers.

5. The method of claim 3, wherein the down-scaled m-bit data contains a sign bit of the n-bit correlation integral values, wherein n and m are positive natural numbers.

6. The method of claim 1, wherein n is 16, and m is 8.

7. The method of claim 1, further comprising: storing the down-scaled m-bit data and the scale level.

8. An apparatus for down-scaling a plurality of n-bit correlation integral values into a plurality of m-bit data (n>m), the n-bit correlation integral values being obtained by correlating global positioning system (GPS) signals with a plurality of expected codes, the apparatus comprising:

an absolute value producing unit configured to select upper (n−m+1) bits from the n-bit correlation integral values to obtain (n−m+1)-bit estimated absolute values, wherein n and m are positive natural numbers;

a maximum value detector configured to detect a significant bit of a maximum value of the upper (n−m+1) bits of the estimated absolute values;

a scale determiner configured to determine a scale level based on the significant bit of the maximum value; and a down-scaling processor configured to down-scale the n-bit correlation integral values into the m-bit data based on the scale level.

9. The apparatus of claim 8, wherein the absolute value producing unit is configured to perform a bitwise negation for (n−m+1) bits of the n-bit correlation integral values when a sign bit of the n-bit correlation integral values is negative to obtain a one's complement of the (n−m+1) bits of the n-bit correlation integral values, wherein n and m are positive natural numbers.

10. The apparatus of claim 8, wherein the scale determiner determines the scale level based on a position of the significant bit of the maximum value.

11. The apparatus of claim 8, further comprising a memory configured to store the down-scaled m-bit data and the corresponding scale level.

12. A method of performing a synchronization acquisition for global positioning system (GPS) signals, comprising:

receiving the GPS signals through a plurality of channels;

correlating the GPS signals with a plurality of expected codes having respectively different delay characteristics to generate a plurality of correlation values;

integrating the correlation values during a predetermined time period to produce a plurality of n-bit correlation integral values, n being a positive natural number;

down-scaling the n-bit correlation integral values into m-bit data based on a scale level, m being a positive natural number that is less than n;

storing the m-bit data in a memory;

reading out the stored m-bit data from the memory to restore n-bit data based on the scale level; and performing a fast Fourier transform (FFT) for the restored n-bit data to obtain a maximum correlation integral value based on a result of the FFT.

13. An apparatus for performing a synchronization acquisition operation on global positioning system (GPS) signals, the apparatus comprising:

a plurality of correlators configured to correlate the GPS signals with a plurality of expected codes respectively having different delay characteristics to generate a plurality of correlation values;

a plurality of integrators configured to integrate the correlation values during a predetermined time period to generate a plurality of correlation integral values;

a down-scaling circuit configured to down-scale the n-bit correlation integral values into m-bit data based on a scale level, m being a positive natural number that is less than n;

a memory configured to store the m-bit data; and a processor configured to read out the stored m-bit data from the memory to restore n-bit data based on the scale level, and configured to perform a fast Fourier transform (FFT) for the restored n-bit data to obtain a maximum correlation value based on a result of the FFT.

14. A global positioning system (GPS) receiver, comprising:

a radio frequency receiver configured to receive global positioning system (GPS) signals via a plurality of channels;

a correlator configured to correlate the GPS signals with each of a plurality of expected codes having respectively different delay characteristics to generate n-bit correlation integral values;

a down-scaling circuit configured to down-scale the n-bit correlation integral values into m-bit data based on a scale level, m being a positive natural number that is less than n;

a fast Fourier transformer configured to perform a FFT for the n-bit correlation integral value to calculate a FFT result value;

a memory configured to store the down-scaled m-bit data and the FFT result value;

a memory controller configured to control data transmission among the memory, the down-scaling circuit and the fast Fourier transformer; and a processor configured to calculate a maximum correlation value based on the FFT result value stored in the memory to control a synchronization acquisition of the correlator.

* * * * *